Patented May 10, 1927.

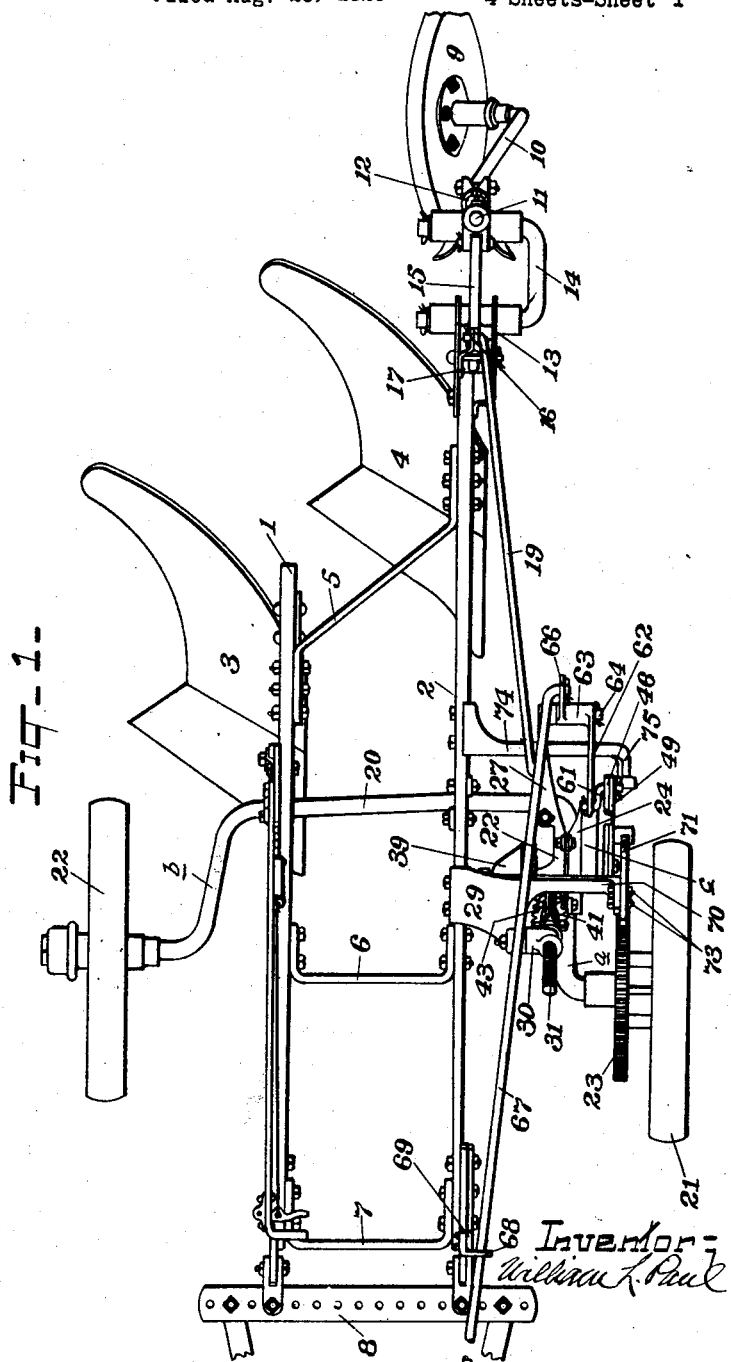

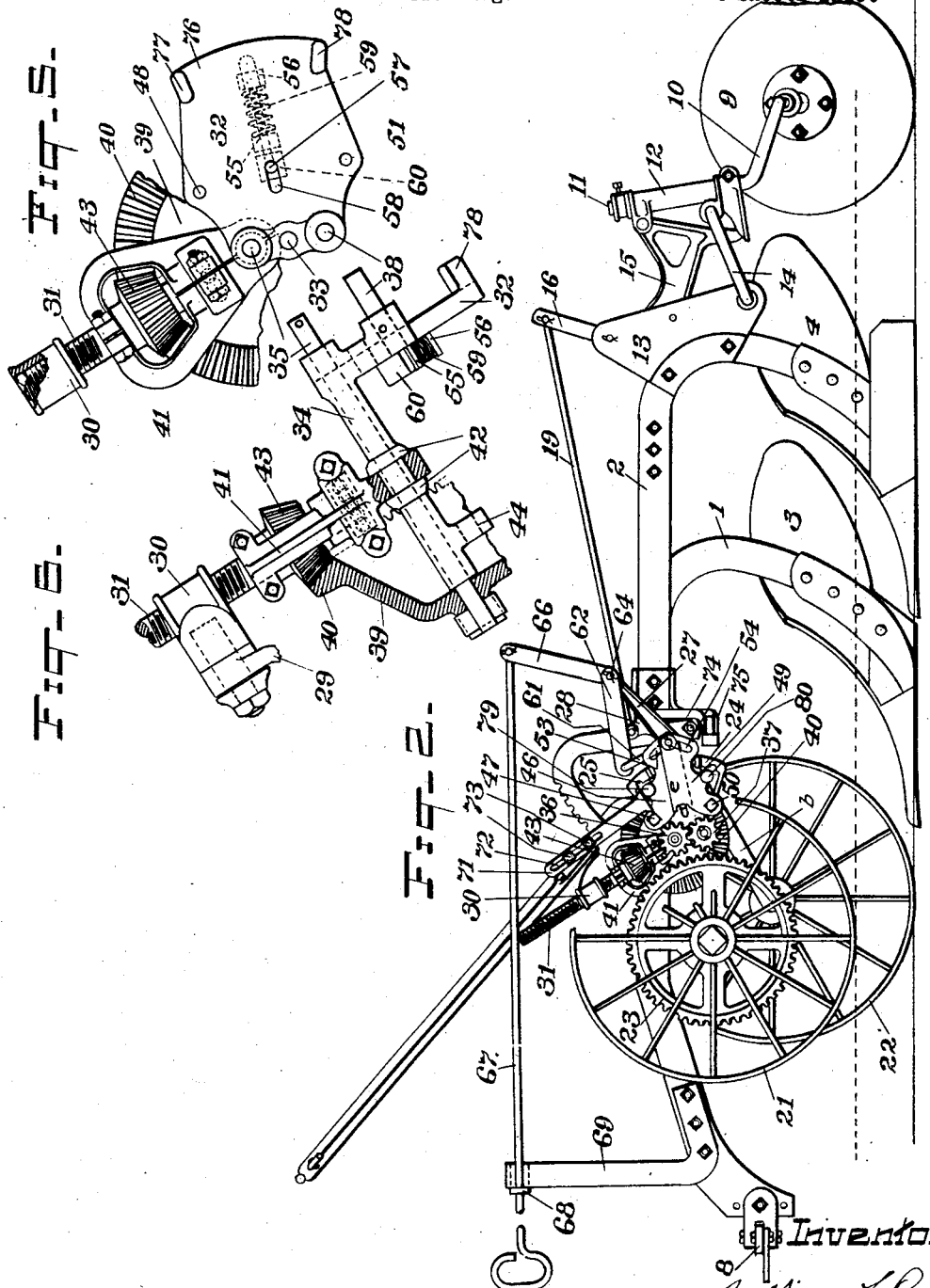

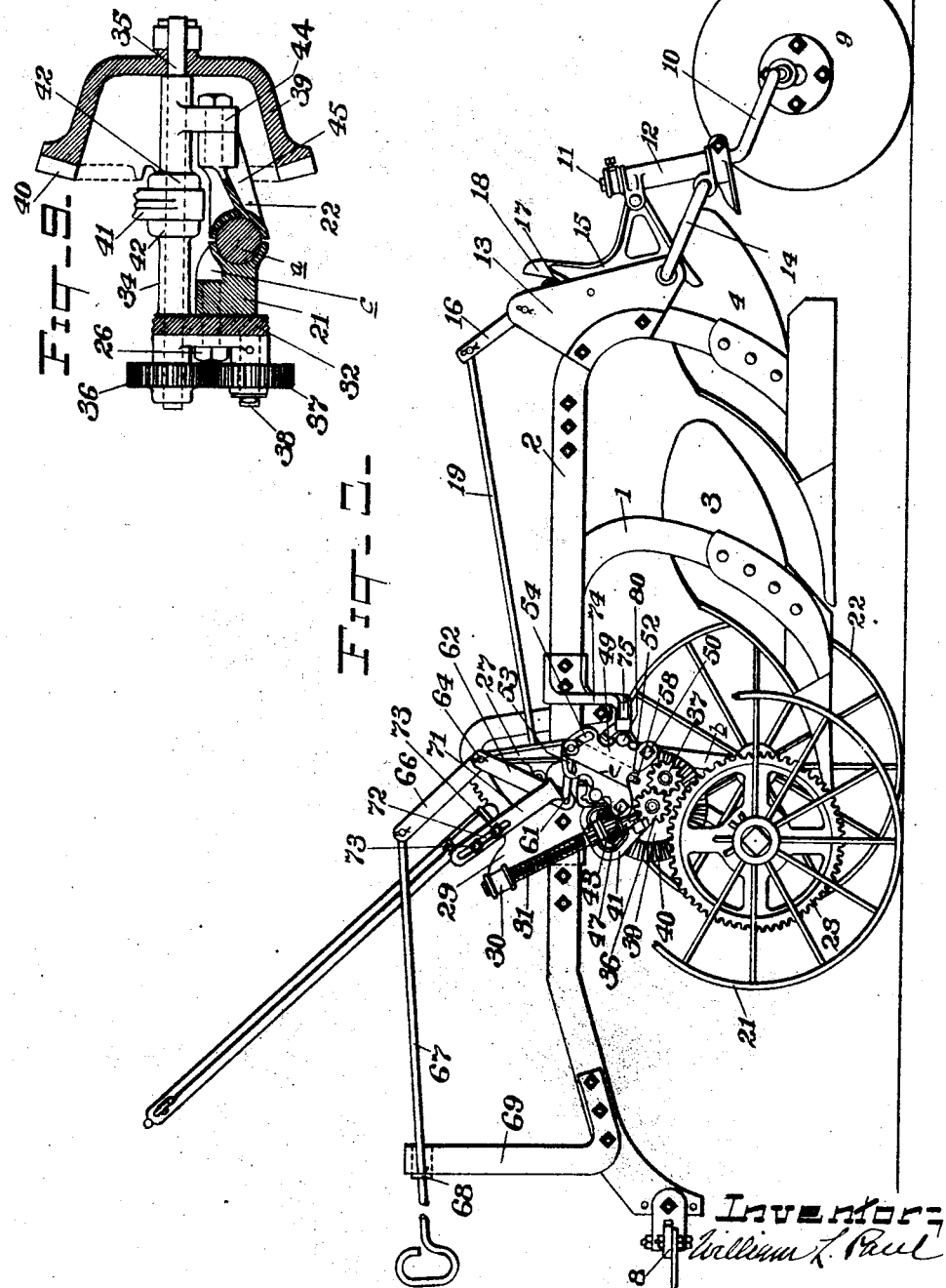

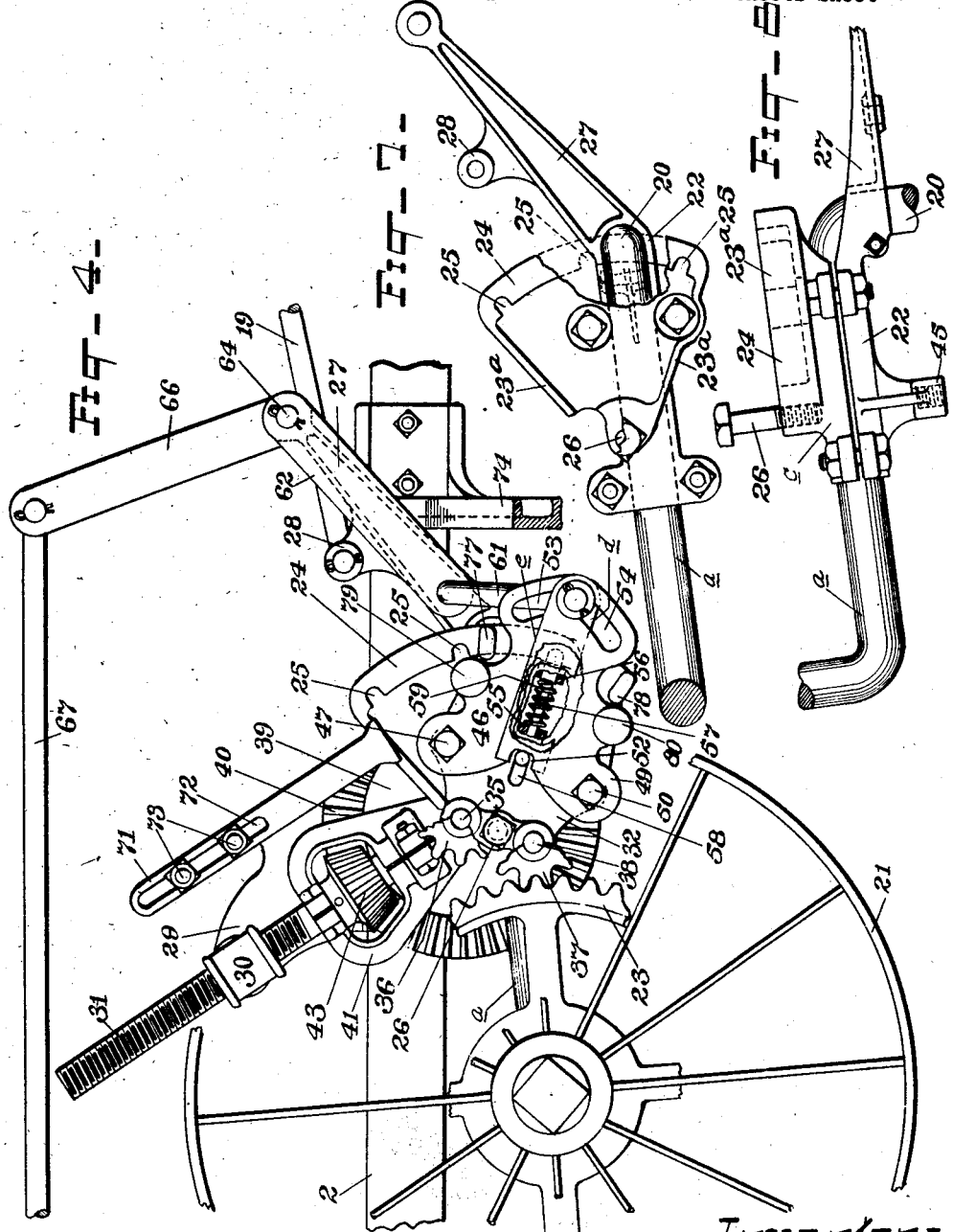

1,627,924

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

GANG PLOW.

Application filed August 23, 1920. Serial No. 405,289.

My invention relates to power lift plows or plows in which the traction power of one of the supporting wheels is utilized to lift and lower the furrow opener or plow body carrying member, and the object of my invention is to provide a mechanism supported on the frame and connectible at will with one of the supporting wheels, and by the operation of which the plow body or bodies can be raised or lowered as may be desired.

Referring to the drawings in which similar numerals indicate identical parts.

Figure 1 is a plan view of a gang plow embodying my invention.

Figure 2 is a side elevation of Figure 1 showing the plow lowered to an operative position.

Figure 3 is a similar view to Figure 2 but showing the plow raised.

Figure 4 is an enlarged detail view of part of the raising and lower mechanism.

Figure 5 is an enlarged detail view of part of the gearing.

Figure 6 is a side elevation in part section of Figure 5.

Figure 7 is an enlarged fragmentary side view of the crank axle and attached parts of the raising and lowering mechanism.

Figure 8 is an underside view of Figure 7, and

Figure 9 is a detail in part section illustrating the pinions and their mounting.

It will be evident that my invention can be utilized in gang plows having any desired number of plow bodies and consequently I do not limit myself to the number of plow bodies or other furrow openers shown, or to the particular construction of the plow to which my invention is applied. I have shown a frame comprising beams 1 and 2 carrying on their rear ends plow bodies 3 and 4. The beams 1 and 2 are spaced apart and secured together by a rear brace 5, a center brace 6, and a forward brace 7. To the forward ends of the beams 1 and 2 is connected a draw bar 8 through which, by suitable devices, the plow is attached to a drawing power.

The rear of the plow is supported by a furrow wheel 9, supported on a crank axle 10 and having an upstanding spindle 11 which is journaled in a bearing 12. On the beam 2 is secured a bracket 13. A U-shaped link 14 has one of its arms pivotally journaled on the lower portion of the bearing 12, and its second arm pivotally supported on the lower portion of the bracket 13. Rockably supported on the bracket 13 is a member 15 which is also pivotally connected to the upper portion of the bracket 13. A lever 16 is pivotally supported, intermediate its length, on the upper end of the bracket 13, and carries, on its lower end, a roller 17 which operates against the lower face of an arm 18 preferably integral with the member 15. A rod 19 connects the upper end of the lever 16 with the forward lifting mechanism, as will be hereinafter described, so that the front and rear of the plow are raised simultaneously.

Rockably journaled in bearings on the frame is a transverse crank axle 20 having a landward downwardly extending portion or crank arm $a$ terminating in a spindle on which is mounted a landwheel 21, and a furrowward downwardly extending portion $b$ terminating in a spindle on which is mounted a furrowwheel $22^a$. Rigidly secured on the landwheel 21 is a gear 23 through which the traction power of the wheel is transmitted to the raising and lowering mechanism.

On the part $a$ of the axle 20 is a bracket $c$ composed of parts 24 and 22 rigidly secured on opposite sides of the part $a$ of the axle by suitable bolts; the part 24 is of a segmental form and has a rim $23^a$ extending at a right angle from its face, part of the rim being arcuate and having three equidistant notches 25 on the inner side of the arcuate portion. The arcuate portion is concentric with a pivot pin or bolt 26 fixed in an enlargement of the rim. The part 22 has extending upwardly and rearwardly therefrom, at an obtuse angle, an arm 27 having a lug 28, intermediate its length, to which the forward end of the rod 19 is pivotally connected.

Rigidly secured on the beam 2 is a bracket 29, and pivotally mounted on the forward upper end thereof is a sleeve 30 threaded interiorly for reception of a screw shaft 31. A tabular member 32 overlaps the part 24 of the bracket $c$ and is pivotally secured thereon by the bolt 26 which extends through an orifice 33 in the member 32. Preferably integral with the member 32, and extending at a right angle thereto, is a sleeve 34 in which is journaled a shaft 35 on the plate end of which is non-rotatably secured a pinion 36 meshing with a similar pinion 37 loosely mounted on a stub shaft 38 on the member 32.

The pinions 36 and 37 are equidistant from the pivot of the member 32 and are mounted respectively on opposite sides thereof; consequently any movement of the member 32 on its pivot will cause a concentric movement of the pinions 36 and 37, and at the same time the screw 31 will be rocked on its pivotal support on the bracket 29, as will be hereinafter described.

On the opposite end of the shaft 35 is rigidly secured a hollow frustrum 39 having a bevel gear 40 forming its edge; a split yoke 41, at its lower end embraces the sleeve 34, and is held between collars 42 preferably integral with the sleeve 34. The upper end of the yoke 41 embraces the screw shaft 31, and in its central portion is formed a socket to receive the lower end of the screw shaft 31, which at this point is provided, preferably, with ball bearings as shown in dotted lines in Figures 5 and 6. Within the yoke 41 a bevel pinion 43 is rigidly secured on the screw shaft 31 and meshes with the bevel gear 40. The parts of the yoke 41 are bolted together as shown. By this construction when the member 32 rocks about the pivot 26 the shaft 35 and the parts connected with it, including the gear 40 and the inner end of the yoke 41, will move with it, thereby rocking the screw 31 so that it maintains its radial position with relation to the gear 40 and the pinion 43 is held properly in mesh with said gear. An arm 44 extends from the sleeve 34 and is securely bolted to a projecting portion 45 of the part 22 of the bracket c.

A plate 46 is pivotally secured on the member 32 by a bolt 47 which is fixed in an orifice 48 in the member 32, and a similar plate 49 is also pivotally secured on the member 32 by a bolt 50 which is fixed in an orifice 51 in the member 32. The plate 49 partly overlaps the plate 46 and is provided with a notch 52 which registers with a similar notch in the plate 46. In the plate 46, at the opposite end from its pivot, is a slot 53 and a similar slot 54 is provided in the plate 49. The slot 53, in the plate 46, is concentric with the pivot of the plate 49, and the slot 54, in the plate 49, is concentric with the pivot of the plate 46.

Secured on the side of the tabular member 32, toward the beam 2, are lugs 55 and 56 perforated to permit longitudinal movement of a latch 57 mounted therein. One end of the latch 57 is bent to extend through a slot 58 and engage with the notches 52 in the plates 46 and 49, the opposite end of the latch is enlarged as shown and is adapted to engage with either of the notches 25 in the part 24; a coil spring 59 surrounds the shank of the latch and exerts its expansive force between the lug 55 and the enlarged end of the latch. A guide block 60 is secured to the latch 57 and is movable therewith against the adjacent surface of the member 32.

A link 61 is bent at one end to extend through the slots 53 and 54 in the plates 46 and 49 and is held therein by a pin or cotter; the opposite end of the link 61 is pivotally connected to an arm 62, which is preferably integral with a sleeve 63, and extends forwardly and downwardly from the sleeve. The sleeve 63 is rockably supported on the upper end of the arm 27 by a bolt or pin 64 and is secured thereon by a cotter. Extending upwardly from the sleeve 63, and preferably integral therewith, is an arm 66 having a rod 67 hooked to the upper end and extending forwardly where it is supported and movable freely in a bracket 68, the latter being secured on a standard 69 mounted on the beam 2.

As more clearly shown in Figure 1 an arm 70 extends landwardly from the bracket 29 and mounted thereon is a stop 71 having a slot 72 through which extend bolts 73 securing the stop in place. By loosening the bolts 73 the stop is adjustable longitudinally in either direction, and by tightening the bolts the stop is held in a desired adjusted position. Rigidly secured on the beam 2 is a landwardly extending arm 74 having its free end 75 bent forwardly and adapted to operate as a stop for a purpose hereinafter explained. The tabular member 32 is provided at each end of its arcuate edge 76 with lugs 77 and 78 respectively, and on the plate 46, intermediate its pivot 47 and slot 53, is a lug 79, and a similar lug 80 is on the plate 49.

As shown in Figure 2 the plow is down in operative position and the pinions 36 and 37 are out of mesh with the gear 23, in other words the parts are in neutral and remain so until it is desired to raise the plow, an operation I will now describe.

When it is desired to raise the plow a pull of the rod 67 will rock the arm 66 forwardly and the arm 62 downwardly, both of said arms being integral with the sleeve 63 pivotally supported on the arm 27. With the downward movement of the arm 62 the plate 46 is rocked on its pivot 47 through the link 61 bearing against the lower end of the slot 53; as the plate rocks, the edge in contact with the end of the latch 57 presses the latch forward until it is disengaged from the central or neutral notch 25 in the part 24 of the bracket c. At this time the edge d of the plate 46 is in contact with the lug 78 on the tabular member 32 and consequently the further downward movement of the plate 46 rocks the member 32 on its pivot 26. During the movement of the parts just described the axis of the screw 31 is moving rearward of the pivot 26 and the weight of the plow completes the operation begun by the pull on the rod 67, and rocking the member 32 sharply the pinion 37 thereon is meshed with the gear 23 on the wheel 21.

The power required is supplied by the traction of the wheel 21 and, as the latter rotates, is transmitted to raise the plow by the gear 23 rotating the pinion 37 which is in constant mesh with the pinion 36. The pinion 36 is rigidly mounted on the shaft 35; consequently rotation of the pinion 36 imparts a similar motion to the bevel gear 40 which in turn actuates the bevel pinion 43 on the lower end of the screw 31. As before stated, the screw 31 has a threaded engagement with the sleeve 30 pivotally supported on the bracket 29, and as the latter is rigidly mounted on the plow, the plow is raised by continued rotation of the screw 31, swinging the crank axle 20 downwardly and rearwardly until the lug 80, on the plate 49 contacts with the stop 75; continuing this movement of the crank axle the pressure of the lug 80, on the plate 49, against the stop 75 will swing the plate 49 so that the straight edge e thereof contacts with the lug 77 on the member 32 swinging the member 32 on its pivot 26 and consequently removing the pinion 37 from the gear 23, and as this occurs the latch engages with the central or neutral notch 25 in the part 24 of the bracket c locking the parts against movement and the plow in a raised position.

To lower the plow the rod 67 is pushed rearwardly rocking the arm 66 in the same direction, and through the link 61 and the arm 62 the plate 49 is rocked upwardly on its pivot 50 until the straight edge e thereof is in contact with the lug 77 on the member 32 and the latch is disengaged from the central or neutral notch 25 in part 24 of the bracket c. The member 32 rocks upward on its pivot 26 and moves the pinion 36 toward the gear 23; at this time the axis of the screw is moved forward of the pivot 26 of the member 32 and the weight of the plow forces the pinion 36 and the gear 23 together, to operate the screw 31 in a reverse direction to that previously described. As the plow descends the crank axle 20 is rocked forwardly and upwardly, and when the lug 79 presses against the stop 71 the plate 46 is rocked on its pivot 47 until the straight edge d thereof operates against the lug 78 on the member 32 swinging the latter downward and moving the pinion 36 away from the gear 23 and allowing the latch to engage with the central notch 25 in the part 24 of the bracket c. From the foregoing description it is manifest that the screw 31 is a unitary rigid member interposed between the furrow opener support or frame and the crank arm a of the axle 10, and that it is capable of moving endwise relatively to one of said members; in the illustrated construction the furrow opener supporting frame, to vary the angular relation of said members to each other and thereby cause the frame and with it the furrow opener to move vertically. This I believe to be broadly new, as well as the making of such unitary member in the form of a screw which by its rotation operates to change the angular relation of said members to each other for the purpose stated.

What I claim is—

1. In a plow comprising a beam, a furrow opener carried by the beam, and supporting wheels, the combination of a screw supported on the beam, connections operated by the rotation of said screw to move the beam and furrow opener vertically, and a train of gearing between said screw and one of the wheels and operable at will to connect the latter wheel with said screw whereby the traction power of said wheel is transmitted to rotate the screw.

2. In a gang plow comprising a beam, a furrow opener carried by the beam, and supporting wheels, the combination of a screw supported on the beam, and a train of gearing connected with said screw and connectible at will with one of said wheels whereby the traction power of said wheel is transmitted to rotate the screw to raise or lower the beam.

3. In a gang plow comprising a beam, a furrow opener carried by the beam, and supporting wheels, the combination of a screw supported on the beam, a gear on one of the wheels, a train of gearing permanently connected with said screw, and means operable at will to connect said gearing to the gear on the wheel whereby the traction power of the wheel is transmitted to rotate the screw to raise or lower the beam.

4. In a gang plow having supporting wheels, the combination of a screw supported on the plow, a gear on one of the wheels, a rockable member, a duality of intermeshing pinions on said member, gearing connecting said pinions with the screw, and means operable at will to rock said member and engage one of said pinions with the gear on the wheel whereby the traction power of the wheel is transmitted to rotate the screw.

5. In a gang plow having supporting wheels, the combination of a screw supported on the plow, a gear on one of the wheels, a rockable member, a duality of intermeshing pinions on said member, gearing connecting said pinions with the screw, means operable at will to rock said member and engage either of said pinions with the gear on the wheel, and means to hold the pinions from engagement with said gear.

6. In a gang plow having supporting wheels, the combination of a screw supported on the plow, a gear on one of the wheels, a rockable member, a duality of intermeshing pinions mounted on said member and located respectively on opposite sides of the pivot thereof and normally out of engagement with the gear on the wheel, gearing connecting the pinions with the screw, and means to rock said member and engage either of the pinions with the gear on the wheel whereby the traction power of the wheel is transmitted to rotate the screw to raise or lower the plow.

7. In a gang plow having supporting wheels, the combination of a screw supported on the plow, a rockable member, a duality of intermeshing pinions on said member and located respectively on opposite sides of the pivot thereof and normally out of engagement with the gear on the wheel, gearing connecting the pinions with the screw, and means to rock said member and engage either of the pinions with the gear on the wheel to transmit the traction power of said wheel to rotate the screw to raise or lower the plow, the rocking movement of said member swinging the screw on its support on the plow whereby the longitudinal axis of the screw is swung to one side or the other of the pivot of said member as the plow is raised or lowered.

8. In a gang plow, the combination of a rockable crank axle having supporting wheels, a screw supported on the plow, and a train of gearing connected with said screw and connectible at will with one of said wheels whereby the traction power of said wheel is transmitted to rotate the screw to rock the axle.

9. In a gang plow, the combination of a rockable crank axle having supporting wheels, a screw supported on the plow and operatively connected to rock said axle by its rotation, and a train of gearing operable to rotate said screw in either direction and connectible at will with one of said wheels to be driven thereby, whereby the traction power of said wheel may be employed to rotate the screw in one direction or the other to raise or lower the plow.

10. In a gang plow, the combination of a rockable crank axle having supporting wheels, a screw supported on the plow, a gear on one of the wheels, a train of gearing permanently connected with said screw, and means operable at will to connect said gearing to the gear on the wheel whereby the tranction power of the wheel is transmitted to rotate the screw and rock the axle to raise or lower the plow.

11. In a gang plow, the combination of a rockable crank axle having supporting wheels, a screw supported on the plow, a gear on one of the wheels, a rockable member pivotally supported on the axle, a duality of intermeshing pinions on said member, gearing connecting said pinions with the screw, and means operable at will to rock said member and engage one of said pinions with the gear on the wheel whereby the traction power of the wheel is transmitted to rotate the screw and rock said axle.

12. In a gang plow, the combination of a rockable crank axle having supporting wheels, a screw supported on the plow and operatively connected to rock the axle by its rotation, a gear on one of said wheels, a rockable member pivotally supported on said axle, gearing movable by the rocking of said member to operatively connect said gear with said screw for rotating the latter from one of the supporting wheels, and means operable at will to rock said member.

13. In a gang plow, the combination of a rockable crank axle having supporting wheels, a screw supported on the plow, a gear on one of the wheels, a rockable member pivotally supported on said axle, a duality of intermeshing pinions on said member, gearing connecting said pinions with the screw, means operable at will to rock said member and engage either of said pinions with the gear on the wheel, and means to hold the pinions from engagement with said gear.

14. In a gang plow, the combination of a rockable crank axle having supporting wheels, a screw pivotally supported on the plow, a gear on one of the wheels, a rockable member pivotally supported on the axle, a duality of intermeshing pinions rotatably mounted on said member and located respectively on opposite sides of the pivot thereof and normally out of engagement with the gear on the wheel, gearing connecting the pinions with the screw, and means to rock said member and engage either of the pinions with the gear on the wheel whereby the traction power of the wheel is transmitted to rotate the screw and rock said axle to raise or lower the plow.

15. In a gang plow, the combination of a rockable crank axle having supporting wheels, a gear on one of the wheels, a rockable member pivotally supported on the axle, a duality of intermeshing pinions on said member and located respectively on opposite sides of the pivot thereof and normally out of engagement with the gear on the wheel, a screw pivotally supported on the plow, gearing connecting the pinions with the screw, and means to rock said member and engage either of the pinions with the gear on the wheel to transmit the traction power of the wheel to rotate the screw and rock said axle to raise or lower the plow, the rocking movement of said member swinging the screw on its pivotal support on the plow whereby the longitudinal axis of the screw is swung forward of the pivot of said member as the plow is raised.

16. In a gang plow, the combination of a rockable crank axle having supporting wheels, a gear on one of the wheels, a rockable member pivotally supported on the axle, a duality of intermeshing pinions on said member and located respectively on opposite sides of the pivot thereof and normally out of engagement with the gear on the wheel, a screw pivotally supported on the plow, gearing connecting the pinions with the screw, and means to rock said member and engage either of the pinions with the gear on the wheel to transmit the traction power of the wheel to rotate the screw and rock said axle to raise or lower the plow, the rocking movement of said member swinging the screw on its pivotal support on the plow whereby the longitudinal axis of the screw is swung rearward of the pivot of said member as the plow is lowered.

17. In a gang plow having supporting wheels, the combination of a screw supported on the plow, a train of gearing connected with said screw and connectible at will with one of said wheels whereby the traction power of said wheel is transmitted to rotate the screw and raise or lower the plow, and means automatically operative when the plow reaches a predetermined raised (or lowered) position to disconnect the gearing from said wheel.

18. In a gang plow, the combiantion of a rockable crank axle having supporting wheels, a screw supported on the plow, a train of gearing connected with said screw and connectible at will with one of said wheels whereby the traction power of said wheel is transmitted to rotate the screw to rock the axle and raise or lower the plow, and means automatically operative when the plow reaches a predetermined raised (or lowered) position to disconnect the gearing from said wheel.

19. In a gang plow having supporting wheels, the combination of a screw supported on the plow, a train of gearing connected with said screw and connectible at will with one of said wheels whereby the traction power of said wheel is transmitted to rotate the screw to raise or lower the plow, and means automatically operative to disconnect the gearing from said wheel at a predetermined point.

20. In a gang plow, the combination of a rockable crank axle having supporting wheels, a screw supported on the plow, a train of gearing connected with said screw and connectible at will with one of said wheels whereby the traction power of said wheel is transmitted to rotate the screw to rock the axle and raise or lower the plow, and means automatically operative to disconnect the gearing from said wheel at a predetermined point.

21. In a gang plow having supporting wheels, the combination of a screw supported on the plow, a train of gearing connected with the screw and connectible at will with one of said wheels whereby the traction power of said wheel is transmitted to rotate the screw to raise or lower the plow, and means automatically operative to disconnect the gearing from said wheel when the plow is raised or lowered to a predetermined point.

22. In a gang plow, the combination of a rockable crank axle having supporting wheels, a screw supported on the plow, a train of gearing connected with said screw and connectible at will with one of said wheels whereby the traction power of said wheel is transmitted to rotate the screw to rock the axle and raise or lower the plow, and means automatically operative to disconnect the gearing from said wheel when the plow is raised or lowered to a predetermined point.

23. A power lift plow comprising supporting wheels, furrow opener supporting means mounted thereon and movable vertically relatively thereto, a screw operatively connected with said furrow opener supporting means and operating by its rotation to move the same vertically, power transmitting means adapted to be actuated by one of said wheels to rotate said screw, and optionally operable means for controlling the rotation of said screw.

24. A power lift plow comprising supporting wheels, furrow opener supporting means mounted thereon and movable vertically relatively thereto, a screw operatively connected with said furrow opener supporting means and operating by its rotation in one direction or the other to raise or lower said furrow opener supporting means, power transmitting means adapted to be actuated by one of said wheels to rotate said screw in either direction, and optionally operable means for controlling the rotation of said screw.

25. A power lift plow comprising a crank axle and supporting wheels mounted thereon, furrow opener supporting means mounted on said axle and movable vertically by the rocking thereof, a screw operatively connected with said furrow opener supporting means and with said crank axle and operating by its rotation to rock the axle to move said furrow opener supporting means vertically, power transmitting means adapted to be actuated by one of said wheels to rotate said screw, and optionally operable means for controlling the rotation of said screw.

26. A power lift plow comprising a furrow opener supporting frame, a crank axle supporting said frame, a wheel mounted on said axle, a rotatable screw interposed between and connected with said frame and said axle, and movable endwise relatively to one of said members by its rotation to change their angular relation to each other and thereby move the frame vertically, and optionally controlled means for rotating said screw from said wheel.

27. A power lift plow comprising a furrow opener supporting frame, a crank axle supporting said frame, a wheel mounted on said axle, a rotatable screw interposed between and connected with said frame and said axle, and movable endwise in either direction relatively to one of said members by its rotation to change their angular relation to each other and thereby move the frame vertically, and optionally controlled means for rotating said screw from said wheel.

28. A power lift plow comprising a furrow opener supporting frame, a crank axle on which said frame is supported, wheels mounted on said crank axle, a rotatable unitary member interposed between and connected with said frame and said axle and by its rotation being movable endwise relatively to one of said members to change their angular relation to each other and thereby move said frame vertically, gearing movable into or out of position to operatively connect one of said wheels with said unitary member, whereby said member may be rotated by the traction power of said wheel, and means for optionally controlling the rotation of said unitary member.

WILLIAM L. PAUL.